(12) United States Patent
Zhang et al.

(10) Patent No.: US 11,470,948 B2
(45) Date of Patent: Oct. 18, 2022

(54) CONVERTIBLE COMBINATION OF ATTIRE AND BACKPACK WITH NETWORK COMMUNICATION AND INTELLIGENT SENSING FEATURES

(71) Applicants: Chunlei Zhang, Richmond (CA); Yin Sheng Zhang, Richmond (CA)

(72) Inventors: Chunlei Zhang, Richmond (CA); Yin Sheng Zhang, Richmond (CA)

( * ) Notice: Subject to any disclaimer, the term of this patent is extended or adjusted under 35 U.S.C. 154(b) by 148 days.

(21) Appl. No.: 17/166,253

(22) Filed: Feb. 3, 2021

(65) Prior Publication Data

US 2022/0240653 A1  Aug. 4, 2022

(51) Int. Cl.
*A45F 3/04* (2006.01)
*H04W 84/18* (2009.01)
*G16Y 40/35* (2020.01)
*G06F 1/16* (2006.01)
*G16Y 30/00* (2020.01)
*A45F 3/00* (2006.01)

(52) U.S. Cl.
CPC ............... *A45F 3/04* (2013.01); *G06F 1/163* (2013.01); *G16Y 30/00* (2020.01); *G16Y 40/35* (2020.01); *H04W 84/18* (2013.01); *A45F 2003/003* (2013.01)

(58) Field of Classification Search
CPC ...... A45F 3/04; A45F 2003/003; G06F 1/163; G16Y 30/00; G16Y 40/35; H04W 84/18
See application file for complete search history.

(56) References Cited

U.S. PATENT DOCUMENTS

| | | | | |
|---|---|---|---|---|
| 2018/0343024 A1* | 11/2018 | Sahebjavaher | ........ | H04B 1/385 |
| 2019/0365086 A1* | 12/2019 | James | ........ | A45F 4/12 |
| 2020/0113318 A1* | 4/2020 | Hall | ........ | H04N 1/00095 |

* cited by examiner

*Primary Examiner* — Michael A Keller

(57) ABSTRACT

The application introduces the technology of Internet of Things into field of attire design, and creates a communicative and sensitive device: the composite and convertible attire with network communication and intelligent sensitive features, referred to as COMS Attire, its purpose is to liberate mobile devices from "hand-held" mode, and use the convertibility of attire to protect and enhance intelligent elements. Attire is big in size, large in capacity, deformable in shape, attachable and detachable in structure, and its carried items can be exposed and concealed at will. Attire is a daily necessity in people's lives, and the most suitable place for development of new generation of mobile intelligent device to replace the miniaturized traditional mobile one; the technical achievements of hardware "miniaturization" make COMS attire more intelligent, more fashionable and popular with users. COMS attire increases the choice of chip types, and expands the installation space of intelligent components.

20 Claims, 6 Drawing Sheets

COMS Attire

Fig. 1: COMS Attire
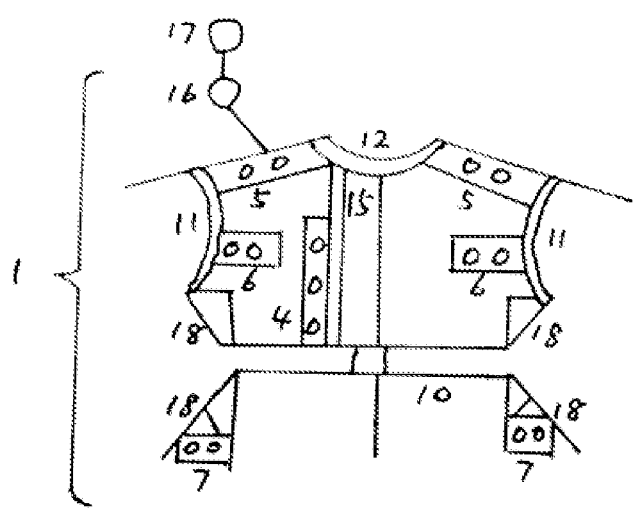

Fig. 2: Backpack Transformed from COMS Attire
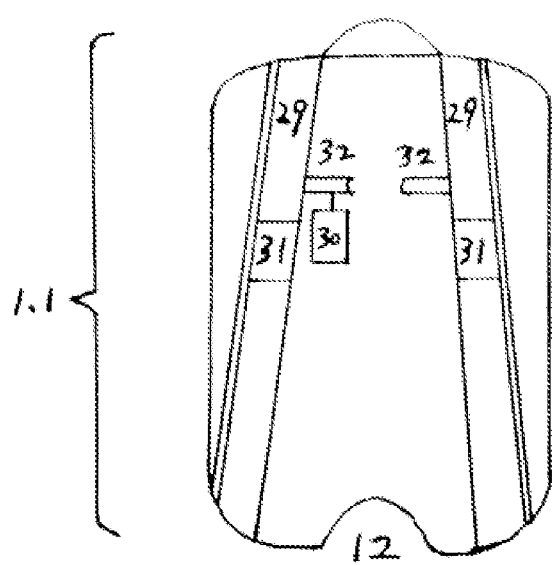

Fig. 3: Back Apron Transformed from COMS Attire
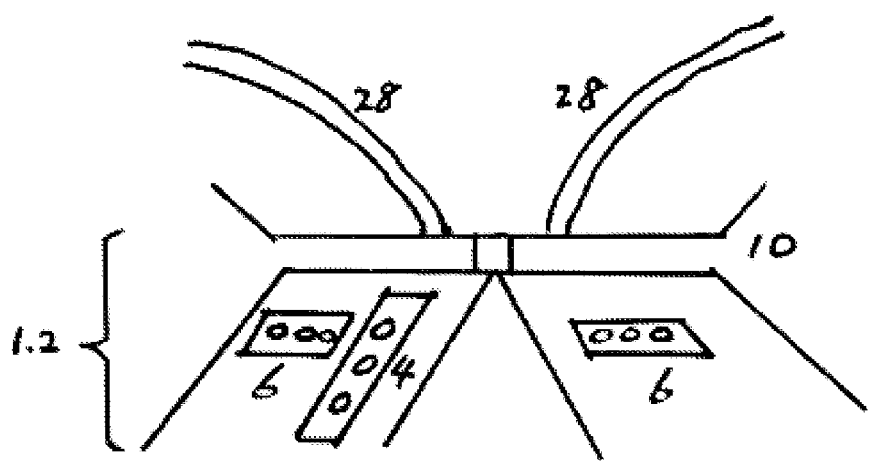

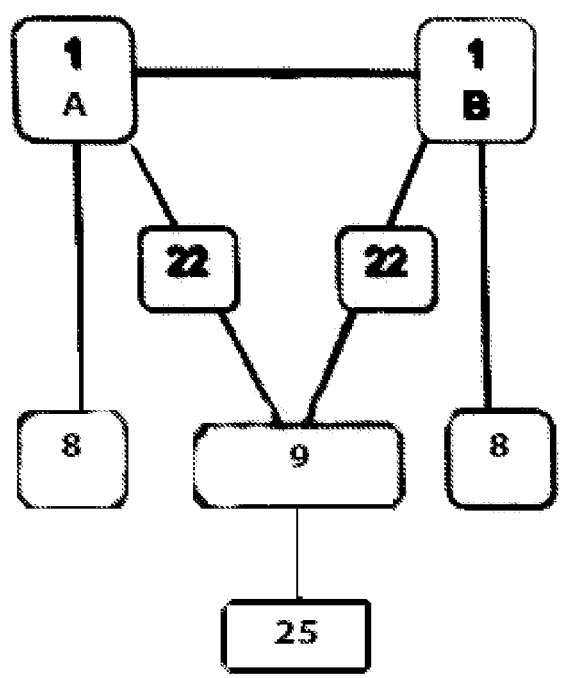
Fig. 4: Information Transmission System of COMS Attire

Fig. 5: Supporting Holder for Devices and Components
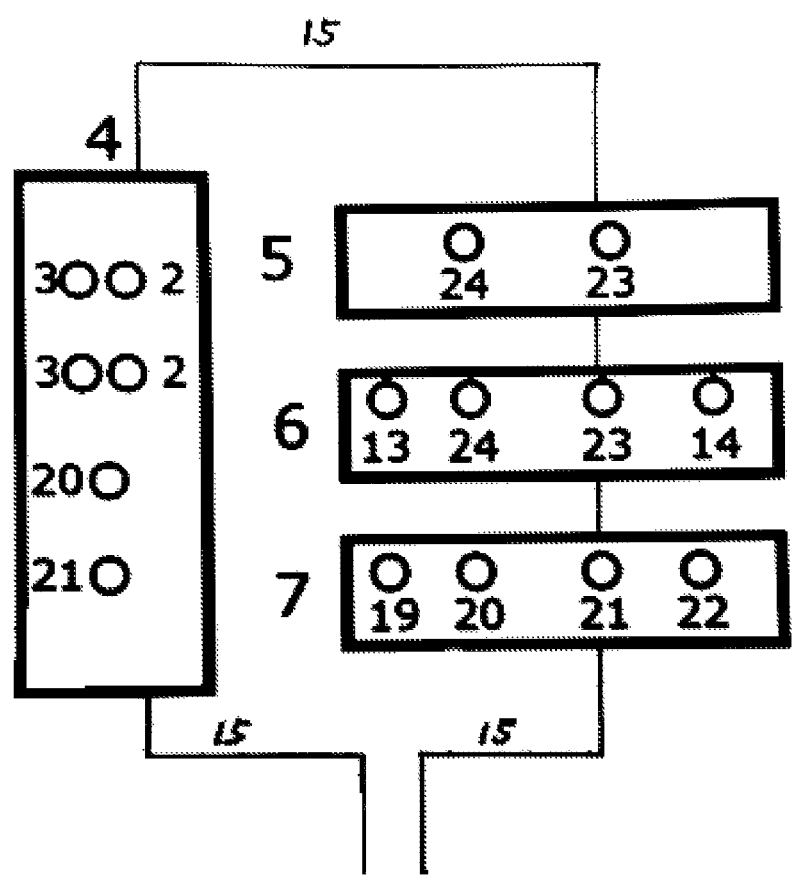

Fig. 6: A Corded Foldable Supporting Holder of Screen Detachably Suspended on COMS Attire
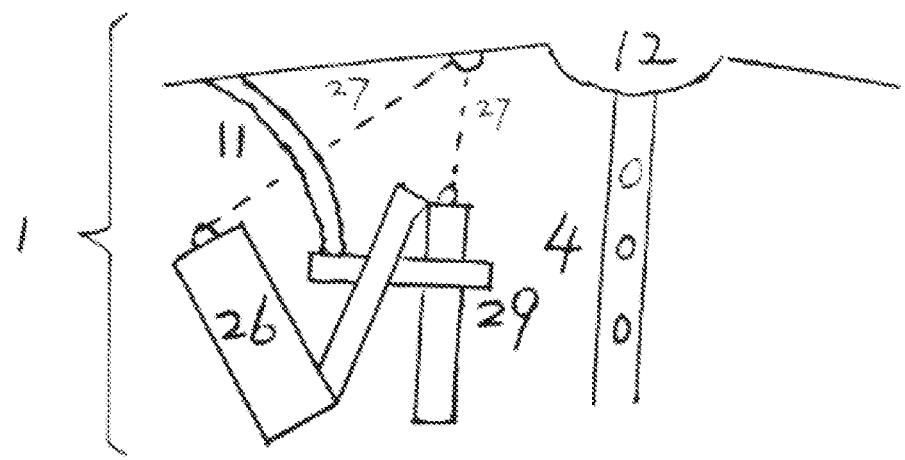

CONVERTIBLE COMBINATION OF ATTIRE AND BACKPACK WITH NETWORK COMMUNICATION AND INTELLIGENT SENSING FEATURES

FIELD OF INVENTION

This application is a continuation of Canada patent application No. CA 3018077 filed 2018 Sep. 20, now abandoned.

This is an application in the field of Internet of Things of combination comprising intelligent wearing, remote and short-range communication and sensing technologies, the purpose of it is to create the composite and convertible attire with features of phone, network communication and intelligent sensing, referred to as COMS attire, which is for user to use remote voice communication, data transmission system and information recognition system safely and conveniently.

BACKGROUND INFORMATION

From home telephones to traditional cell phones, and to today's intelligent mobile phones, in the long course of development, people never get rid of the "handholding" mode of home phone and cell phone, but as mobile phones become indispensable tools for people's lives, the inconvenience of "handholding" is getting more and more obvious, and the risk of loss and damage is also increasing, which become the motivation of the invention of COMS attire.

The implementation of COMS attire needs two stages, the first stage is to "retreat in order to advance", that is to expand the applicability and user accumulation of COMS attire by reducing the infrequent function and highlighting the key functions of traditional intelligent terminal devices comprising remote control, mobile phone, scanner, sensor, to improve the targeting and efficiency of COMS attire by simplifying operation steps and links; in the second stage, COMS attire will realize the full functions of traditional terminal devices, and acting as a components of intelligent terminal devices, which comprise chips for intelligent terminal devices that combined on attire; in the end COMS attire will combine the existing technology, the latest technology and features of attire with large capacity and soft to be foldable to create the function and economic effect that traditional intelligent terminal devices cannot achieve.

BRIEF DESCRIPTION OF THE DRAWINGS

FIG. 1 is a front and perspective view of COMS attire, in this figure, the supporting holders installed or placed backup components of intelligent device are deployed in the more concealed location of attire and appropriately decorated, and the devices and components on it can be conveniently used by wearers without damaging the appearance of attire in accordance with an embodiment of the present invention. In FIG. 1, 1 is the COMS attire; 4 is the supporting holder of keyboard at the opening of the front chest location of attire; 5 is the supporting holder of microphone and warning device on both or one shoulders of attire; 6 is the supporting holder of microphone and warning device in pocket cover location of attire; 7 is the supporting holder of backup components of intelligent device in special pockets of attire; 10 is the decorative waistband pipe and fabric decorative cord pipe; 11 is the shoulder strap and fabric decorative cord pipe; 12 is the collar, neckband and fabric decorative cord pipe; 15 is the fabric decorative cord pipes on COMS attire; 16 is the corded microphones; 17 is the corded earphones; 18 is the special pockets on COMS attire.

FIG. 2 is a front view of backpack transformed from COMS attire and the backpack strap with backup components for intelligent devices from being concealed in the attire interlayer changed to a real backpack strap of backpack in accordance with an embodiment of the present invention. In FIG. 2, 1.1 is the backpack transformed from COMS attire; 29 is the backpack strap and attached fabric decorative cord pipe; 30 is the corded supporting holder of device on backpack strap; 31 is the special pocket attached on backpack strap; 32 is the fastener on backpack strap.

FIG. 3 is a front view of back apron with auxiliary components for intelligent devices after being transformed from COMS attire in accordance with an embodiment of the present invention. In FIG. 3, 1.2 is the back apron transformed from COMS attire; 4 is the supporting holder of keyboard at the front chest location of attire; 6 is the supporting holder of microphone and warning device in pocket cover location of attire; 10 is the decorative waistband pipe and fabric decorative cord pipe; 28 is the sling of waistband.

FIG. 4 is a schematic view of the information system composed of two related COMS attire in accordance with an embodiment of the present invention. In FIG. 4, 1 is the COMS attire; 8 is the existing mobile phone; 9 is the remote server; 22 is the data fragment processor; 25 is the voice and ringtone device in a remote home or a designated location.

FIG. 5 is a schematic view of the supporting holders for intelligent devices and components comprising hardware and software and their interconnections on COMS attire in accordance with an embodiment of the present invention. In FIG. 5, 2 is the dial and function key or buttons; 3 is the lock keys or covers of avoiding accidental pressing; 4 is the supporting holder of keyboard at the front chest location of attire; 5 is the supporting holder of microphone and warning device on both or one shoulders of attire; 6 is the supporting holder of microphone and warning device in pocket cover location of attire; 7 is the supporting holder of backup devices and components in special pockets of attire; 13 is the remote controlled broadcasting device of attire; 14 is the remote controlled help-seeking device of attire; 15 is the fabric decorative cord pipe on COMS attire; 19 is the power supply devices (including rechargeable batteries and devices for connecting to external power outlets); 20 is the power switch; 21 is the chips, including fixed chips and removable chips; 22 is the data fragment processor; 23 is the microphone in fixed location; 24 is the warning device.

FIG. 6 is a front view of a corded foldable supporting holder of screen detachably suspended on front chest location of COMS attire for wearer's hands-free viewing in accordance with an embodiment of the present invention. In FIG. 6, 1 is the COMS attire; 11 is the shoulder strap and fabric decorative cord pipe; 12 is the location of collar, neckband and fabric decorative cord pipe; 26 is the corded foldable supporting holders of mini-screen; 27 is the traction rope; 29 is the decorative cover strip of attire.

SUMMARY OF THE INVENTION

This is a method, process and product of using attire as the carrier of function of network communication and sensing control, it combines intelligent wearing technologies, network communication technologies and intelligent sensing technologies to form an composite and convertible combination of attire and backpack with features of phone and network communication and intelligent sensing, referred to as COMS attire, then partly and also capable of totally replacing the function of traditional intelligent terminal devices, and acting as a supplementary device of traditional intelligent terminal devices, which uses the characteristics of attire that wearable and easy storage, large carrying capacity and less restrictions on items, to make hardware components for remote function to be distributed in different parts of attire, thus making a complete product that integrates attire and data communication, data and physical sensitivity, data transmission, data security and data storage together and to be used conveniently and safely by users.

The composite and convertible attire uses the convertible attributes of attire to protect and enhance intelligent elements.

DETAILED DESCRIPTION

The composite and convertible attire is a combination of integrated fabric convertible wearables, intelligent software and hardware, and modern network technology used by wearer in different environments and seasons; wherein the COMS attire is composed of main body of COMS attire and matching body of COMS attire; one body of COMS attire is made of dark color based fabrics suitable for the elderly and worn in cooler season, and another body of COMS attire is made of light color based fabrics suitable for young people and worn in the warm season; the main body of COMS attire is equipped with intelligent hardware and software and decorative fabric cover as functional attire with intelligent features, the matching body of COMS attire is only an ordinary attire for covering and decorating intelligent devices and independent components on main body of COMS attire, it is not equipped with intelligent hardware and software; the main body of COMS attire and the matching body of COMS attire are made into a complete attire with a interlayer in the middle; the main body of COMS attire worn outward acts as a functional attire, the matching body of COMS attire worn outward acts as an ordinary attire, and the interlayer of main body of COMS attire and matching body of COMS attire turned from inside out to form a backpack; the integrated fabric convertible wearables comprise: back apron made by folding COMS attire and connecting jumpsuit pants and be tied to waist of wearer with a waistband to solve the problem of devices carrying and protection during the wearer's stripping in hot day, and wearer has no extra heavier items to carry; backpack formed by turning the inner layer of interlayer of COMS attire to outer layer of backpack and turning the top of COMS attire to bottom of backpack to solve the problem of devices carrying and protection during the wearer's stripping in hot day, but wearer has extra heavier items to carry; shoulder bag made by folding COMS attire with neck bag as a container for COMS attire to solve the problem of devices carrying and protection during the wearer's stripping in hot day, and wearer does not like to wear back apron and backpack; wherein the back apron, backpack and shoulder bag is the deformation of COMS attire and also a method of carrying and protecting intelligent devices and independent components on; wherein, the COMS attire, back apron, backpack and shoulder bag are a combination of modern network and intelligent technologies, fabric technologies, and attire and bag making technologies, they share the same set of intelligent devices and independent components on COMS attire; wherein intelligent devices and independent components are selectively attached to COMS attire by wearer.

The detachable hat on COMS attire capable of be used as a neck bag and a shoulder bag after it is detached from attire, and be stored in a pocket in the interlayer of COMS attire during it is left unused.

The hubware is a chipset specifically supports the features of communication and sensing on COMS attire, it is programmed to support intelligent devices, independent components, and auxiliary devices on COMS attire; the chipset of hubware come with remote network connectors comprising Wi-Fi, and short-range network connectors comprising Bluetooth.

The components of hubware chipset comprise chips of system data storage, chips of user data storage, chips of application software storage, chips of fragmented data processor, and chips of temporary data processing (RAM).

The hubware chipset is attached to a supporting holder placed in an inner pocket located in COMS attire's hidden part; when a corded supporting holder is used, there is a traction rope connected to the inner pocket; the supporting holder uses a data cord to interact with other supporting holders located in other parts of COMS attire through a fabric decorative cord pipe; the supporting holders of other attire parts are attached with intelligent devices, independent components, and auxiliary devices comprising keyboards, mini-screen, power devices and additional chips; the hubware is used to support intelligent devices, independent components, and auxiliary devices attached to other supporting holders.

The hubware chipset has a SIM card slot to make SIM card freely installed, replaced and removed by user, wherein the SIM card is a subscriber identification module.

Each hubware chipset is set with a dedicated network account, it is also a dedicated network account of COMS attire; this network account is used to manage the information of hubware chipset and overall COMS attire by attire owners; the hardware identity information of hubware chipset is a key credentials to be verified when this dedicated network account is under login.

Wherein the hardware identity information of hubware chipset comprises serial number and internal code, it acts as a communication verified credentials in network activity of COMS attire.

When hubware acts as a center chip on COMS attire, the center chip is programmed to provide system support to various mobile intelligent devices, auxiliary devices and independent intelligent components of COMS attire as it connects these devices and independent components.

Several pieces of COMS attire capable of be formed into a communication group through the settings in network account, and hardware identity information of their hubware is used by group members to identify each other during group communication.

When hubware acts as a communication verified credentials on COMS attire, it is divided into a primary hubware and a secondary hubware, primary hubware supports initiator account of communication, secondary hubware supports participant account of communication; the primary hubware holder sets up a contact list in his initiator account of communication; wherein initiator account is network account on server, contact list is a list of serial numbers of secondary hubwares of COMS attire, only the secondary hubwares listed in contact list of initiator account are eligible to communicate with primary hubware, then participant capable of contacting initiator through network; wherein, several COMS attire with different hubware form a communication group, a hubware in this communication group is status of primary hubware, but in another communication group may be status of secondary hubware, its serial numbers of hubware and the contact list involved will be subject to different participation authorizations in different communication groups.

COMS attire comprises COMS attire with attribute of a complete set of comprehensive intelligent devices, and COMS attire with attribute of a backup and supplementary platform for existing intelligent devices comprising mobile phones; the backup platform attributes of COMS attire enable COMS attire to use ready-made intelligent devices to reduce certain devices and independent components equipped on COMS attire, comprising reducing hubware, dedicated mini-screen, dedicated merger phone comprising interphone, dedicated scanner, dedicated sensor and dedicated radio on COMS attire; the supplementary platform attributes of COMS attire enable COMS attire to make up for some of shortcomings of existing intelligent devices, such as the intelligent rear-view system on COMS attire is used to help existing mobile phones complete function of observing the scene behind wearer's body.

When COMS attire serves as a backup and supplementary platform for existing intelligent devices comprising mobile phones, COMS attire is connected to existing intelligent devices comprising mobile phones, through data cords and short-range network connectors comprising Bluetooth, to provide backup and functional supplements to existing intelligent devices comprising mobile phones; wherein the data cord jack used to connect COMS attire on existing intelligent device comprises USB jacks and a headphone jacks; COMS attire's backup and functional supplementary tasks comprise providing power supply support, data storage support, fragmented data processor support, semi-network operating system support, speedy chain button support, speed dial key support, special speed dial key on attire for housing doorbell and indoor reminder bell, and scannable communication support.

COMS attire serves as a backup and supplementary platform for existing intelligent devices comprising mobile phones, as a way to get rid of the hand mode of existing mobile phones, the upper part of front chest part of attire is fixedly added with a decorative cover strip to make existing mobile phones to be temporarily placed on upper chest part of attire like a suspension bridge for wearer to observe, in this case, traction ropes from neckband and shoulder strap of attire are connected to decorative cover strip, and directly connected to existing mobile phone for stabilization.

The bottom part of non-folding single section supporting holder and the decorative pocket cover on the chest of attire capable of be temporarily bonded together with magnetic materials, and the top part of the supporting holder is connected to neckband of attire with a traction rope to form the shape of a suspension bridge specially used for placing mini-screen comprising mobile phones.

When the corded existing mobile phone is not in use, it is stored in pocket on the upper chest part of attire.

When COMS attire serves as a backup and supplementary platform for existing intelligent devices comprising mobile phones, the scannable communication support is that the COMS attire provides scannable codes, images, and physiological and physical information for existing intelligent devices comprising mobile phones to make wearer quickly contact the remote target and perform communication; the scannable physiological and physical information is set in advance in a dedicated network account by wearer and a third party, and scannable items attached to COMS attire comprising QR codes are generated in the dedicated network account.

COMS attire capable of be made into a combination of main-suit and sub-suit of COMS attire, wherein the sub-suit is a simplified main-suit capable of be detached from COMS attire and used independently in the form of a short collarless vest; sub-suit of COMS attire is detachably tied on collar location of main-suit of COMS attire with fastener comprising fabric bolt, sling, button and zipper; the sub-suit of COMS attire can be detachably tied on collar location of main-suit of COMS attire with fastener comprising fabric bolt, sling, button and zipper; the sub-suit share the same attire identity code, the same dedicated application software of COMS Attire comprising speedy chain button software, and the same network account with main-suit of COMS attire; the sub-suit with simple network voice and message communication function capable of be detached from main-suit separately for wearer to use in special scenes comprising in summer; when hubware is equipped on main-suit, the right to change network account settings is in main-suit, when hubware is equipped on sub-suit, the right to change network account settings is in sub-suit; the sub-suit of COMS attire selectively equipped devices comprising dedicated merger phone comprising interphone, dedicated scanner, dedicated sensor, dedicated radio and intelligent rear-view system; the sub-suit is optionally equipped with supporting holder of hubware, supporting holder of rechargeable batteries comprising solar cells, supporting holder of keyboard and mini-screen, supporting holders of micro camera, and backpack strap; wherein the backpack strap attached with keyboard and mini-screen is detached from main-suit of COMS attire; supporting holders of devices capable of be placed in the interlayer of sub-suit, and they capable of be made into ornaments attached on the appearance of sub-suit; the supporting holder of rechargeable batteries comprising solar cells capable of be detached from sub-suit to be recharged separately at any time.

The sub-suit of COMS attire includes sleeved and sleeveless; wherein the sleeve of sleeved sub-suit is s detachable supporting holder selectively attached devices comprising mini-screen, keyboard and micro camera, and with fabric decorative cord pipes on it; the sleeved sub-suit of COMS is tied to the inner side of main-suit of COMS attire with fastener comprising fabric bolts, slings, buttons and zippers, and its sleeves are exposed to outside through the cuff of sleeveless main-suit of COMS attire to make supporting holder's devices be easily used by wearer.

The sub-suit and main-suit of COMS attire capable of be found and reminded each other via network connector and hoot devices; if the sub-suit and main-suit of COMS attire are separated by a short distance, user presses search button on a piece of attire, the hoot device on another piece of attire is activated and to sound a hoot, and user find desired attire by looking for sound; wherein the search button on attire is connected to short-range network connector comprising Bluetooth; if sub-suit and main-suit of COMS attire is far away from each other, user presses search button on a piece of attire, the hoot device on another piece of attire is activated and to sound a hoot for requesting contact, or for attracting attention of wearer of another piece of attire or passerby.

The intelligent rear-view system on COMS attire is a set of devices to take in and record in the scene behind wearer's body through a rear-view camera equipped on back of COMS attire, then wearer observes the scene behind his body from mini-screen located at the front of COMS attire; wherein the rear-view camera is selectively placed on a concealed part of back side of COMS attire comprising neck bag, waistband, intelligent decorative fabrics, the outer surface of backpack, as well as a special corded supporting holder attached rear-view camera hung on the back side of attire by wearer at will; the rear-view camera being hidden as ornament on back of COMS attire act as the eyes behind wearer; wherein the rear-view camera with security purposes placed on back side of COMS attire is for weakening attention of target person and avoiding disrespect to target person; the image taken by rear-view camera on back side of COMS attire is transmitted to mini-screen on front of COMS attire via data cord in fabric decorative cord pipe, also capable of via network connector comprising Bluetooth and Wi-Fi, and selectively transmitted by wearer to his personal network account, also capable of be transmitted to a third-party network account.

When hubware acts as a fragmented data processor on COMS attire, as an option, the fragmented data processor and local fragmented data are combined stored in hubware set to reject other data to store.

The working steps of fragmented data processor on COMS attire comprise: splitting full data into local fragmented data and remote fragmented data, wherein the full-data is transmitted from mobile devices to COMS attire, then local fragmented data is stored in storage chips of hubware on COMS attire, remote fragmented data is transferred to remote server for storage by COMS attire; wherein fragmented data is added interfering code, code sorting is disrupted, data informative meaning is destroyed by processor, and never restored to original full data with only one separate fragmented piece.

Local fragmented data capable of be made into decorative graphics on attire comprising QR code graphics used for login verification credentials for a particular COMS attire account, and directly used for COMS attire account login verification credentials; wherein when local fragmented data as verification credential is detected by account system, the local fragmented data and related remote fragmented data enter the process of assembling and restoring to original full data file on server side; assembly and restoration succeeds, account login verification succeeds, otherwise, login verification failed.

The hubware capable of connects to desktops and laptops other than COMS attire through a data cord and short-range network connector comprising Bluetooth, then the stored data in hubware comprising system data, user data, application software and fragmented data processor capable of be used by desktops and laptops; when hubware acts as an external component of desktops and laptops, COMS attire is selectively converted into a smaller shoulder bag placed close to desktops and laptops.

When a hubware provides basic operating system support for desktops and laptops other than COMS attire, the system data stored in hubware is input into the RAM of desktops and laptops to support the operation comprising keyboard, mini-screen, mouse, external storage device and RAM, then the desktops and laptops are dominated by hubware, and their original operating system stop working; in hubware dominated desktops and laptops, the operating system is composed of two parts, one part is provided by hubware, the other part is downloaded from network server, and the network part is complementary to the part provided by hubware; the network part of operating system is guided and detected by hubware, and it is downloaded to desktops and laptops as needed; the two parts of operating system are combined into one and run in the RAM of desktops and laptops.

After desktops and laptops dominated by hubware are shut down, the hubware part and the network part of operating system automatically disappear from the desktops and laptops due to characteristics of RAM, and all the operation traces built on this operating system architecture also disappear from desktops and laptops, then the desktops and laptops revert to original operating system architecture.

The speedy chain buttons on COMS attire comprise the speedy group-signaling chain button and the speedy function-selection chain button; wherein the dedicated application software comprising speedy chain button software is pre-installed in hubware of COMS attire, also capable of be downloaded by wearer from App store comprising network account of COMS attire and other network resources and installed in hubware, then the wearer establishes his personal network account based on the dedicated application software comprising speedy chain button software, and sets, adjusts and manages the functions of speedy chain buttons, as well as the related intelligent devices, auxiliary devices, independent components attached on COMS attire by account; wherein the group-signaling chain button is used to send contact signals to relatives, friends and police in an emergency, as long as the speedy group-signaling chain button is pressed once by wearer, system will send emergency signals to a group of pre-set members, comprising sending a signal to alarm devices in remote home and designated locations via remote connector on COMS attire comprising Wi-Fi, then, the people from remote home and designated locations contact wearer through remote-controlled speaker on COMS attire; wherein when SIM card is used to send call signals with group-signaling chain button, the button is set to automatically dial the phone number to each member of group according to the pre-set order, once the first recipient is contacted, the subsequent signals transmission are automatically stopped; wherein the speedy function-selection chain button is not a speed dial key for fast contact in communication, the speedy function-selection chain button software helps wearer to set function of speedy function-selection chain button on COMS attire; the function of speedy function-selection chain button capable of be set in network account by: when the same speedy function-selection chain button is consecutively pressed by wearer, the different times of pressing to a speedy function-selection chain button, the different type of function is obtained by the speedy function-selection chain button, for example, the speedy chain button is pressed once or other times, the merger phone is activated, the speedy chain button is pressed three or other times, the camera is activated, the speedy chain button is pressed four or other times, the interphone is activated; wherein, the number of presses of the speedy function-selection chain button capable of following the voice prompt of mini-speaker on COMS attire and the name of selected function be displayed on mini-screen on COMS attire; the hubware of COMS attire is connected to speedy chain buttons by data cords and short-range network connector comprising Bluetooth, and the speedy chain buttons are also connected intelligent devices, auxiliary devices and independent components on COMS attire by data cords and short-range network connector comprising Bluetooth.

The speedy chain button software of COMS attire capable of be downloaded from App store and installed on other intelligent devices comprising existing mobile phones instead of COMS attire, and the speedy chain button on COMS attire is set in dedicated network account via other intelligent device, in this case, the speedy chain button on COMS attire capable of be connected to connector jack of mobile device instead of COMS attire via data cords, then the speedy chain buttons on COMS attire become speedy chain buttons of other mobile device, and no longer controls the devices on COMS attire; wherein the connector jack of mobile device comprises headphone jack; after the speedy chain buttons on COMS attire are disconnected from other mobile device, the speedy chain buttons on COMS attire reverts to the speedy chain buttons of COMS attire for controlling intelligent devices, auxiliary devices and independent components on COMS attire.

When the speedy chain button software is installed on ordinary existing mobile phone, the ordinary existing mobile phone capable of temporarily serve as a hubware of COMS attire; the implementation steps are: the speedy chain button software of COMS attire is installed to an ordinary existing mobile phone, and the ordinary existing mobile phone is connected to intelligent devices, auxiliary devices and independent components on COMS attire with data cords, then, the wearer sets speedy chain buttons of ordinary existing mobile phone according to operation process and specified rules required by speedy chain button software to make devices and independent components on COMS attire to work following instructions of ordinary existing mobile phone.

The intelligent decorative fabric comprising the decorative pocket cover is a independent intelligent component attached on COMS attire's main body and its interlayer, it is a intelligent carrier in shape of ordinary fabric printed and carried scan able code, embedded intelligent software, chips and auxiliary hardware rather than ordinary fabric in traditional concept; wherein the scan able codes comprise QR code, barcode, images, and identification codes for physical and physiological characteristics; the functions of intelligent decorative fabric comprise identification, verification and alarm prompts.

Among them, the decorative pocket cover is mainly used for decorative purposes, and it also serves as a special pocket for placing intelligent cards, such as intelligent door entry cards, and the entrance of said pocket is concealed on the back sides of the decorative pocket cover.

The intelligent decorative fabric comprises ordinary scannable and recognizable decorative fabrics, special hardware decorative fabrics, and mixed decorative fabrics, wherein the ordinary scannable and recognizable decorative fabrics without any intelligent hardware, and be simply printed and added with scannable codes, images, and information be recognizable by intelligent sensing devices; wherein the mixed decorative fabric is both printed with scannable and recognizable information, and installed with intelligent hardware.

The special shape and form of intelligent decorative fabric comprise neck bag cover, pocket cover, badge shape, backpack strap, and waist belt; wherein the neck bag cover is located on exposed part of back of COMS attire; the backpack strap is usually concealed in interlayer of COMS attire, and be detachable from interlayer of attire, and capable of be in the form of waist belt to temporarily equipped on COMS attire to act as an intelligent decorative fabric; wherein the fastener for temporary installation of intelligent decorative fabric comprises fabric bolt, sling, button and zipper; as a special case, after COMS attire is converted into backpack, the original items carried by COMS attire are all transferred to inside of backpack and, then the intelligent decorative fabric in interlayer of attire changes attached to outer surface of backpack to protect backpack.

The installation of intelligent decorative fabric on COMS attire comprises permanent installation and detachable installation; wherein the permanent installation is used for intelligent decorative fabric comprising ordinary scannable and recognizable decorative fabrics be fixedly sewn to attire, or the scannable and recognizable information be printed directly on attire; wherein the detachable installation is used for intelligent decorative fabric comprises ordinary scannable and recognizable decorative fabrics, special hardware decorative fabrics, and mixed decorative fabrics, these intelligent decorative fabrics are temporarily attached to COMS attire with binder comprising fabric bolt, sling, button and zipper to facilitate information, software and hardware on COMS attire be updated at any time.

An intelligent decorative fabric is separated from interactive mobile device by a certain distance, the mobile device issues alarm prompt; wherein alarm prompt of intelligent decorative fabric is realized by network way and intelligent sensitive way; the mobile devices comprise ordinary mobile devices installed sensing software and mini-alarm devices attached to intelligent decorative fabric; wherein sensing software comprises software for reads and uploads RFID tag.

The network way is mainly applied to mobile devices interacted with network, in this way, the intelligent decorative fabric is installed intelligent chip with short-range network connection functions comprising Bluetooth; the chip pre-sets a program to alarm when it exceeds a certain distance of mobile device, and the chip is connected to a mini-alarm device, or as a component of COMS attire, the mini-alarm device is made into an ornament attached to intelligent decorative fabric, when over-distance separation occurs, the intelligent decorative fabric and the alarm unit of mobile device give alarm prompts either unilaterally and jointly.

The intelligent sensing devices on COMS attire comprise sensitive buttons, sensitive decorative fabrics, sensitive decorative badges and sensitive signs, they are used to control intelligent devices and independent components on and outside COMS attire comprising function activation switches, function selection switch, communication connection switch and power switch; wherein the acceptable information by intelligent sensing devices on COMS attire comprises physical information comprising light source, physiological information comprising fingerprints and facial features, digital information comprising images and identification codes; wherein the intelligent sensing function is pre-set in dedicated network account of COMS attire and updated by wearer in the account as needed; wherein the intelligent sensing device capable of be used for protective reminder of COMS attire, in this way, the intelligent sensing device comprising healthcare sensing device is attached to the attire part close to the wearer's body and easy to access other information sources, and an intelligent decorative fabric in the form of ornament to control alarm device; wherein the intelligent sensing devices capable of be set to "over-separation" reminder function, then if items carried by COMS attire is close to working intelligent sensing device, mini-alarm device is at rest, but if items carried by COMS attire is away from working intelligent sensing device by a certain distance, mini-alarm device will give alarm prompt.

An interactive network account for intelligent decorative fabric on COMS attire is set up in advance by user, and the user's personal information in account is used to identify and verify items carried by COMS attire; wherein, the item information set by user in advance in network account is extracted from user's personal network account at any time through scanner, the extracted data comprising owner ID information, contact information, carried items information, system access key information, travel schedules and transportation details.

The merger phone is a dedicated voice transmission system on COMS attire comprising SIM card data transmission system, remote network transmission system comprising Wi-Fi, and interphone system; merger phone is a combination of functionality of SIM card phone, communication software phone and interphone.

The merger phone on COMS attire is an integral part of COMS attire rather than a existing mobile phone, it shares auxiliary devices on attire comprising power supply, speakers, keyboard and network connection configuration; wherein the network connection configuration comprises SIM card (subscriber identification module), Wi-Fi, Bluetooth; wherein SIM card mainly used for GSM network, W-CDMA network and TD-SCDMA network, but compatible modules also be used for DEN phone; as a phone on COMS attire issuing commands to SIM card, the card execute or reject according to standard specification; wherein SIM card serve as an information storage partly for COMS attire.

As an option, the SIM card on COMS attire provides a data cord and short-range network connectors comprising Bluetooth for existing mobile phone without SIM card, when the existing mobile phone without SIM card connected to data cord on COMS attire, it shares the SIM card on COMS attire and to gain the ability to connect to network; merger phone on COMS attire capable of uses a secondary SIM card of existing mobile phone and shares a phone number with existing mobile phone, and the merger phone on COMS attire are limited to a pre-set function range.

The interphone on COMS attire is an integral part of merger phone rather than a existing interphone, and it shares auxiliary devices on attire comprising power supply, speakers, keyboard and network connection configuration; it also shares network resources on COMS attire; different interphone on COMS attires realize direct communication with each other; as a special case, COMS attire is under monitoring in a region or within a group range by a interphone on COMS attire, then people know whether a COMS attire kept within monitoring by intelligent devices and to find the over-range separation of COMS attires each other.

Each piece of COMS attire includes at least two scannable codes comprising QR codes, and one code is specially for owner of COMS attire and capable of be used as an attire identity code, it is used to set up and log in to personal network account by attire owner after it is scanned, and the other code is used for other people, it is scanned by others to obtain the public information of attire owner's account, and further, each piece of COMS attire has two identity information comprising attire identity code and hubware hardware identity information, hubware is removable and its identity information is replaceable from attire, but attire identity code is permanently attached to COMS attire.

The attire identity code is unique in system of COMS attire, it is attached to attire, comprising attached to intelligent decorative fabrics on attire, and it forms an interactive system with network accounts.

The attire identity code and dedicated network account of COMS attire are preset for each piece of attire; user first scans the attire identity code to activate network account, then to set information and functions in this account; as a key element of network account security verification, the attire identity code and hubware ID need to be verified and recognized by system together.

The COMS attire's scannable codes comprising QR codes capable of be normally displayed on mini-screen on COMS attire for people scanning to access network accounts and obtain information.

The content of COMS attire's network account capable of be public, semi-public and concealable; when the account is set to close the scannable function, the account information not be displayed after the attire identity code is scanned; when the account is set to semi-public, only the pre-selected content of account be displayed after attire identity code is scanned; when the account is set to open, after attire identity code is scanned, all content of account is displayed.

The network account is used to support COMS attire's communication and intelligent sensing features; each piece of COMS attire is registered a personal network account by wearer on dedicated server, the contents set in account comprise: the generating of scannable codes on intelligent decorative fabric, the assignment of functions and tasks of each key in keyboard, the setting of contact list, the deployment related to intelligent sensors, as well as the provision of personal information of wearer, items carried by COMS attire, travel information, scope of information reminder and specific receiver; after network account and its contents are set, wearer chooses to press function key or buttons on COMS attire to work.

The remote control comprises active remote control of COMS attire and passive remote control of COMS attire; the active remote control comprises speakers by remote control, automatic voice devices by remote control, alarm device by remote control, camera by remote control, power switch by remote control; the passive remote control means the device or function on COMS attire is remotely controlled by others, it comprises camera, power switch, alarm device, mini-speaker, eye-catching color flash, keyboard on COMS attire.

The active remote control comprises remote control for indoor appliance; in this case, the remote control keys or buttons on keyboard of COMS attire are preset by user through dedicated network account of COMS attire; wherein the indoor appliances controlled by remote control comprise lighting appliances, door opening and locking appliances, monitoring appliances and alarm appliances.

The power switch of COMS attire is connected to different battery packs, the turn-on and turn-off of power switch on COMS attire capable of be controlled by others from other locations through network; generally, low-energy devices or components on attire are continuously provided with power, and high-energy devices or components on attire are temporarily provided with power by remotely controlling power switch; wherein, COMS attire is equipped with several batteries comprising solar cells connected different power switches and according to sequences of common use, temporary use and standby use be remotely controlled to increase the effective time of attire power supply; wherein the ordinary and rechargeable batteries are placed in hidden part of COMS attire, and is connected to devices comprising power switch with power cord.

The dedicated power device on attire not only centrally powers the various special devices and components on attire after charging from the outside of attire, but also powering additional traditional smart devices through its open interface.

The solar cells comprising stickable thin-film solar cells equipped on attire are a supplementary and backup power supply used to protect the emergency power supply of devices and independent components on attire after ordinary batteries are detached from attire or the battery fails, as well as used to protect the long-term power supply of low-energy devices and independent components comprising remote-controlled power switches on attire.

The mini-alarm device as an auxiliary component of COMS attire comprises a remote-activated alarm device and a spot alarm device; the remote-activated alarm device stored in a pocket and interlayer of COMS attire makes a sharp sound to attract attention of passers-by when the controller at a remote location starts the alarm device on COMS attire through network; the spot alarm is directly activated by wearer of COMS attire; as an option, spot alarm device and the button of spot alarm is stored in a pocket of attire with a traction rope to connect to pocket; wherein, the use of COMS attire alarm devices comprises warning tweets to prevent the loss of elderly and children, warning tweets to prevent loss of wearer's items, and deterrent warning tweets when the wearer is harassed by malicious people; wherein, the warning tweet to prevent the loss of elderly and children means: a third party remotely controls the switch on COMS attire and activates the alarm device through network, then the alarm of COMS attire worn by the elderly and children sounds warning tweet; wherein, the warning tweets to prevent the loss of wearer's items comprise: the main-suit and the sub-suit of COMS attire are separated by a certain distance, the main-suit and the sub-suit sound warning tweet at the same time; COMS attire is separated from other clothing with intelligent interactive components by a certain distance, COMS attire and other clothing sound warning tweets unilaterally and bilaterally; the backpack transformed from COMS attire and the owner of backpack carrying intelligent interactive component are separated by a certain distance, then the alarm device on backpack and the intelligent interactive device carried by owner sound warning tweet; the controlled distance comprises the signal distance of short-range network connector comprising Bluetooth and the length of cord of alarm device on COMS attire; as long as the cord of alarm device is disconnected from the connected magnetic contact due to over-distance, the alarm device sound a warning tweet; wherein the magnetic contact is placed on wearer's ordinary clothing and other items; wherein, the deterrent warning tweet when the wearer is harassed by malicious people adopts spot alarm device, and the wearer activates the alarm device by hand to sound warning tweet; wherein at the same time when the alarm device sounds a warning tweet, the help signal and contact information appear on mini-screen on COMS attire.

The supporting holder is mainly used to bear devices and its software and hardware components of COMS attire, wherein the keyboard or buttons, chips and auxiliary devices, and independent components are centralized equipped on supporting holders, wherein the keyboard contains dial and function keys; the attached supporting holders are concealed equipped on different parts of attire, and be covered with decorative piece, or be placed in interlayer of attire; the supporting holder is made of soft or semi-soft plastic, fabric and natural materials, or hollow sheets with built-in cords, or the support holder is made into a rollable curtain structure composed of small hard pieces.

The COMS attire is equipped with single or multiple supporting holders selectively attached devices comprising mini-screen, keyboard and micro camera; when the single supporting holder is equipped on COMS attire, the supporting holder is detachable and transferrable to be temporarily equipped on different parts of COMS attire according to different situations of attire being used, and the location of temporary installation comprises sub-suit of COMS attire, backpack strap, front chest part of COMS attire; when the multiple supporting holders with the same functionality are equipped on COMS attire, a special switch will be equipped on attire for selecting supporting holders, as long as one of supporting holders with the same functionality is selected by wearer, the functions of other supporting holders capable of be disabled.

The supporting holders comprise attached supporting holder and corded supporting holder, wherein the attached supporting holder is fixedly mounted on attire without being freely moved; the corded supporting holder is usually placed in pocket of lower part of attire easy for user to operate manually; wherein only attached supporting holder on COMS attire, or only corded supporting holder is on COMS attire, or they are placed together on COMS attire.

The attached supporting holder mainly comprises supporting holder of keyboard usually located at opening of front chest part of attire of COMS attire about buttons or zipper location; supporting holder of microphone and warning device usually located on shoulders of attire of COMS attire, or selectively act as a decorative pocket cover of COMS attire; supporting holder of auxiliary and backup devices usually located in special pocket of attire of COMS attire.

The corded supporting holder is mainly used for attaching keyboard comprising dial keys, function keys, lock keys; as a option, dial, function and lock keys are combined with remote control keys to form a separate portable device of COMS attire with a traction rope to connect to pocket of attire; wherein lock keys is for avoiding accidental pressing on keys by wearer, wherein the cords comprise normal cord, power cord and data cord in fabric decorative cord pipe; the length of normal cord, data cord, or power cord are extended long or short outside pocket, but usually shorter than the length of wearer's arm.

The corded supporting holder as a combination of earphones and microphone capable of be made into a mask shape, or called a lower jaw mask, it has a towing cord connecting pocket on chest part of attire, and ring-shaped elastic cords are placed at both ends of lower jaw mask to tie the ears of wearer; the lower jaw mask in use is placed on wearer's cheeks and lower jaw, the earphones on mask are close to wearer's ears, and the microphone on mask is close to wearer's mouth.

The waistband of attire capable of be used as a supporting holder for COMS attire batteries comprising solar cells; in this case, the ordinary and rechargeable battery pack is placed in the openable interlayer of waistband and be removable at any time; the waistband served as a battery supporting holder capable of be freely taken off from COMS attire for charging or replacing batteries; the data cord jack is deployed on waistband to facilitate connection with devices or independent components on COMS attire.

The individual function keys and buttons capable of be placed to inside of pockets located on lower part of attire in the form of attire buttons, or placed to decorative cover of the pockets; the individual function keys and buttons capable of not be attached to a special supporting holder of keyboard, but they are connected to keyboard with data cords; wherein the individual function keys and buttons comprising speed dial key, speedy chain button, and button of spot alarm; the individual function keys and buttons capable of be respectively placed to sub-suit, or main-suit, or both of COMS attire; when sub-suit and main-suit of COMS attire are disassembled and worn separately, the individual function keys and buttons on two pieces of attire work independently and are not affected by each other.

The keyboard comprises a keyboard mounted on supporting holder, a keyboard mounted directly on attire in the form of function buttons, a keyboard mounted on backpack straps, and a corded keyboard with a traction rope connected to pocket for user freely hand hold.

The dial key and function key of COMS attire are made into attire button shapes installed in normal buttons location of attire, wherein the button shapes comprise circular, square, triangle and diamonds; buttons of different shapes installed in a mix so that the keys with different functions be distinguished by hand of wearer.

The keyboard of COMS attire is configured with special dial and function key, as user presses the special keys, COMS attire get communicated with user's remote home or a designated place through network system, or make remote one-way voice transmission, or remote control the voice and ringtone device at remote designated place, or remote control automatic recording at remote designated place.

The update of speed dial key of COMS attire comprises: direct update, the chip of speed dial key on COMS attire is directly updated from server by user access his personal network account to change setting; indirect updated, the chip of speed dial key is detached from COMS attire and plugged into other computing devices to be updated through network server by user access his personal network account to change setting, then the newly updated chip is reinstall to COMS attire, then the speed dial key of COMS attire gets new function.

The fabric decorative cord pipe is used to cover the cords passing through it and to decorate attire according to aesthetic requirements; fabric decorative cord pipes are deployed on attire, the main fabric decorative cord pipes comprise neck fabric decorative cord pipes, shoulder fabric decorative cord pipes, chest fabric decorative cord pipes; wherein the neck fabric decorative cord pipes is placed along the bottom of collar; the shoulder fabric decorative cord pipes is placed along the top of sleeve, the two ends of fabric decorative cord pipe are connected to inner pocket of armpit of attire main body, and open to inner pocket of attire; the chest fabric decorative cord pipes is placed from up end to low end along the opening at front chest part of attire, length is about the distance between upper and lower pockets; the fabric decorative cord pipes are located in concealed place of attire, they make cords running through them connected end to end as a whole.

The neck fabric decorative cord pipe and shoulder fabric decorative cord pipe be combined with neckband and shoulder strap; wherein the two ends of shoulder strap optionally connect special pockets for placing devices and independent components located in underarm of attire, and the shoulder strap share load of pockets.

The attire is made of wear-resistant lightweight waterproof fabric, its protective measures of intelligent hardware comprise hardware waterproof measures, hardware anti-squeeze cushioning measures, and hardware anti-lost and anti-fall measures of out of season attire; wherein, the hardware waterproof measures mainly refer to the pockets on attire specially for placing intelligent hardware are made by highly waterproof fabric; wherein the special pockets include open and closed pockets.

The COMS attire's composite and convertible attribute is mainly designed for hardware anti-lost and anti-fall measures of out of season attire, the foldability and variability of fabric make COMS attire's ability to carry items flexible, and COMS attire is optionally changed into different shapes at any time comprising back apron, backpacks, shoulder bag.

As a hardware anti-squeeze cushion measure, the fabric interlayer of attire is filled permanently or detachably with soft, light and easy-expandable material fillers or air to make attire expand into cushion pads to protect intelligent hardware on attire and also to keep warm of wearer.

As a hardware anti-lost and anti-fall measure of out of season attire, COMS attire capable of be converted into a back apron to be used by wearer in hot season, conversion steps are: the original attire is foldable into two overlapping parts with waistband location as dividing line to form a back apron, then the waistband is tied to waist part of wearer as a binding, and several shoulder slings are used to strengthen the stability of waistband of wearer; the back apron with folded original attire as a whole drooped under waistband, but as an option, the COMS attire's keyboard, microphone, earphones and their support holders are movably placed in ordinary pockets of back apron and connected to pocket with cords.

The back apron comprises double-folded back apron, multi-folded back apron and bag-shaped back apron; wherein the bag-shaped back apron is made from the multi-folded back apron, which is wrapped and covered by fixed attached or detachable neck bag on attire, then be made into a bag shape for easy portability and the different aesthetic needs of male and female wearers; the shoulder strap of bag-shaped back apron is made from an additional strap or detachable backpack strap; when a backpack strap acts as a shoulder strap of bag-shaped back apron, the devices on backpack strap comprising keyboard and mini-screen are used for this bag-shaped back apron.

The backpack strap is equipped with pockets capable of holding ordinary mobile phone.

As a hardware anti-lost and anti-fall measure of out of season attire, COMS attire capable of be converted into a backpack with conveniently communicable and intelligent sensing features for use in hot season, conversion steps are: the inside of original attire is converted into the outer side of backpack, also, the intelligent decorative fabric for backpack originally hidden in attire interlayer is converted to outside of backpack; the neck bag and collar on up position of original attire is converted into the bottom part of backpack, and they act as a cushion to protect hardware items in backpack after their interlayer being filled with soft substances comprising air, also, the remote-control rear-view camera comprising night vision camera equipped on neck bag and remote-control light-emitting diode (LED) equipped on collar are converted to bottom part of backpack, then wearer capable of use the mini-screen outside backpack comprising existing mobile device to observe items inside backpack through camera and LED inside backpack without opening the backpack; the space between two-layer of original attire interlayer is converted into the inner space of backpack, then, all the intelligent hardware devices and independent components contained in original attire are contained inside backpack, but they as a whole still functioning as the components of intelligent backpack; the backpack strap is converted into a real backpack strap from concealed in attire interlayer and be actually used as a operable supporting holder of intelligent devices comprising mini-screen and keyboard; the tightening rope at bottom of original attire is converted into a tightening strap at top entrance of backpack, also, the cord pipe in location to tightening rope at bottom of original attire is converted into a decorative data cord and power cord pipe at top entrance of backpack, wherein the data cord capable of be connected to headphones and microphone, and the power cord capable of be connected to external power supply.

As a hardware anti-squeeze cushion measure, after attire is converted into backpack, the collar on the upper part of original attire is converted into bottom of backpack; the collar is composed of two layers of fabric, and the interlayer of collar is removably filled with soft, light and easy-expandable material fillers or air to form a cushion to reduce the squeeze suffered by intelligent hardware from bottom of backpack; the large pocket specially made on original attire is converted into the inner side of backpack removably filled with soft, light and easy-expandable material fillers or air to form a cushion to reduce the squeeze suffered by intelligent hardware from the side of backpack.

As a protective measure for intelligent hardware on COMS attire, the full-set attire is made of double-layer attire, among this double-layer attire, one layer acts as COMS attire and the other layer acts as ordinary attire; it is worn both outside-out and inside-out; when outside-out wear is defined as COMS attire, then inside-out wear is ordinary attire; when attire act as ordinary attire, the COMS attire is hidden in inner layer of the convertible attire.

The installation of communication and sensing software on COMS attire comprises embedded closed installation and free installation.

The embedded closed installation is a security measure for COMS attire, in which, the application software dedicated to COMS attire is embedded in chip of hubware, and it not be uninstalled and replaced freely, but it accepts the update by server, comprising software information update and software version update; software information comprising the software owner; when the software information of COMS attire is updated by server, attire identity code and hubware hardware ID are essential verification credentials.

The free installations is to allow users to install qualified application software on COMS attire, wherein the third-party communication and sensing software are freely installed on a extra chip of COMS attire, and be freely uninstalled; the chip is a backup and optional software installation platform of COMS attire capable of running user's own communication and sensing software without interfering with the work of software in hubware dedicated for COMS attire.

The special pockets are specially designed for storing less accessible items comprising rechargeable batteries and chips, it is located in hidden parts of attire comprising underarm pockets; special pockets are connected with fabric decorative cord pipe, or attached to shoulder straps.

A cord is placed in special pockets of attire for hanging items comprising corded supporting holders, corded keyboard, function buttons, power switches, Internet of Things remote controllers; the length of cords ensure various corded items not separated from pockets, or only allow corded items be separated from pockets at short distances.

The waistband, shoulder strap, neckband are used by COMS attire to support and share load of pocket, wherein waistband is placed in decorative waistband pipe located about the level of waist of wearer on attire.

The power cord and data cord is connected to rechargeable battery or power bank, or connected to different devices, or connect directly to socket outside COMS attire, wherein the rechargeable battery or power bank comprises removable and non-removable batteries placed in pocket of attire near dial key and function button, or mounted on a supporting holder of keyboard, or equipped on other kinds of supporting holders.

The power cord and data cord run through fabric decorative cord pipe on attire, if the powers cord and data cord is detachable, a locking device is placed at the openings at both ends of fabric decorative cord pipe to restrict the free movement of cord and prevent cord from sliding out of decorative pipe.

The mini-screen on COMS attire is divided into a corded detachable mini-screen and a fixed-installed mini-screen, wherein the corded detachable mini-screen connects mobile intelligent device on attire with a data cord, and removable from attire at any time; the corded detachable mini-screen is usually housed in a pocket of attire, and the cord keeps it free to move when used by wearer; as an option, the corded detachable mini-screen is served by mini-screen of existing mobile phone.

After corded detachable mini-screen is removed, part of communication and intelligent sensing features related to display on COMS attire not capable of operating, but the most basic communication and intelligent sensing operations of attire be maintained comprising the transmission of voice and images by network system, remote control by pre-set key or buttons on attire, signal reminder by ringtone and vibration, information verification and tasks switch by scanner or intelligent sensor.

As a special case, the mini-screen is made into a foldable single or double section structure be usually foldable and made into a decorative badge equipped on upper chest portion of attire and is adjacent to supporting holder of keyboard, its bottom piece as an auxiliary part of mini-screen fixed on attire connects shoulder strap and fabric decorative cord pipe of attire; when in use, the mini-screen is unfolded and together with its bottom piece to be made into a shape of suspension bridge placed and exposed on chest part of attire for viewing by wearer; cords attached to neckband or shoulder strap of attire are used to connect foldable mini-screen for stabilization.

The backpack straps on COMS attire is one of the main places for mounted on intelligent hardware devices and independent components rather than the ordinary backpack straps, it is one of the main intelligent support components of COMS attire; the placed devices and independent components on backpack straps are divided into front devices and independent components comprising keyboard and mini-screen, and rear devices and independent components comprising hubware, extra chip, mini-speaker, microphone, battery device, mini-alarm; the backpack straps are equipped with cord pipes, power cords, data cords, and cord with jacks; the rear devices and independent components are concealed in fabric interlayer of backpack strap, and the front devices and independent components are located on the outer surface of backpack strap usually covered with decorative fabric.

When COMS attire acts as attire, the backpack straps are hidden in the interlayer of attire, the backpack strap's attached devices and independent components are connected to the main body of attire through power cord and data cord; when COMS attire acts as a backpack, the backpack straps are exposed to outside and becomes real backpack straps, thus its front devices and independent components comprising keyboard and mini-screen are located in the upper part of backpack straps, its rear devices and independent components comprising hubware, extra chip, mini-speaker, microphone, battery device, mini-alarm are located in the lower part of backpack straps.

A COMS attire has two backpack straps, and the backpack strap is divided into permanent type, detachable type, or a mixture of permanent and detachable type; when COMS attire acts as a back apron, the detached backpack strap is an independent item capable of be used with a waist belt, and the intelligent devices and independent components attached on backpack strap are connected to the main body of COMS attire through power cord or data cord jack, or network connection devices comprising Bluetooth, thus the backpack strap's devices and independent components comprising keyboard and mini-screen are directly used by back apron.

The neck bag can be detachably mounted on collar location of attire with fabric decorative cord pipes, network connection devices comprising Bluetooth, cords and jacks to connect main body of attire; the intelligent devices and independent components attached to neck bag comprise intelligent decorative fabric, mini-speaker, microphone, corded earphone and mini-camera.

The neck bag is made of double-layer fabric, when the interlayer is empty, neck bag usually hangs on the upper part of back of attires as decoration item, but capable of be erected when the interlayer is filled with air or soft filler to make the neck bag become a neck pillow.

The neck bag tied to the attire is usually used as a hat to hang on the back of attire.

The neck bag has jacks for power and the data cord and network connection devices comprising Bluetooth, and the neck bag get connection with devices and independent components of main body of attire through this jack, or network connection devices comprising Bluetooth; when COMS attire acts as a backpack, or this attire remains as it is, the neck bag capable of be removed from attire and tied independently to neck of wearer, as long as the jack of neck bag is connected to jack on backpack strap with a data cord, or connected to network connection devices comprising Bluetooth, the neck bag capable of function as an independent phone and a headset.

The neck bag capable of be used as a shoulder bag after it is detached from COMS attire, then the main body of COMS attire is completely contained in the interlayer of neck bag to form a shoulder bag, and one of the backpack straps of COMS attire is converted into a strap of shoulder bag, and the mini-screen, keyboard and remote control on backpack strap are used for shoulder bag; the shoulder bag converted from neck bag capable of be carried, or be placed in a convenient and conspicuous place indoors for easy finding and use.

Cutting the number of keys of keyboard and using speed dial keys to realize direct communication between COMS attire and other party by using agreed call method, cutting the operation link of COMS attire pre-set on server, and using attire buttons to act as dial keys and function keys to facilitate the manual operation of intelligent function of COMS attire for the elderly and the visually impaired.

COMS attire's main types comprise waistcoat, jacket, vest and ordinary sleeve attire.

COMS attire as carriers with the large capacity of items to be carried, it reduces the requirement for miniaturization of chip size, and that is to say, it reduces the cost of making chips; the lower cost of making COMS attire will lead to lower market price.

A remote-controlled automatic voice broadcasting device is equipped on COMS attire, such as playing voice "I'm lost, please scan the QR code on my attire" or "Please help press the A button on my attire to contact my family" to ask police or others for help.

The technologies used by intelligent locator or independent locator chip equipped on COMS attire comprise satellite locator, which including at least GPS, Location Based Service (LBS), Wi-Fi locator, AGPS, and the Trojan program implanted into mobile communication devices for locating; the intelligent locator or independent locator chip is usually in a dormant state to save energy consumption, and when a signal input or other communication platform sends a start request, the intelligent locator or independent locator chip starts locating operation; as an option, the power switch of locator or independent locator chip on COMS attire is remotely controlled through network, in this case, the power switch is usually in turn off state, and the remote control party remotely turns on the power switch during emergency contact.

The function of locator or independent locator chip is within the selection range of speedy chain button of COMS attire, the wearer directly press the same speedy chain button on COMS attire a certain number of times, then obtaining the location information of preset tracking targets at other location from mini-screen on COMS attire or from other mobile intelligent devices.

The intelligent locator or independent locator chip in a hidden part of COMS attire comprises temporary installation and permanent installation, wherein the place of temporary installation comprises detachable sub-suit of COMS attire, and detachable intelligent decorative fabric on main-suit of COMS attire; wherein, the intelligent locator or independent locator chip together with the detachable sub-suit of COMS attire or detachable intelligent decorative fabric on main-suit of COMS attire capable of be detached from COMS attire at any time to ensure the locating function be only used as an emergency tracking tool in special circumstances comprising searching of missing children and Alzheimer's patients and to avoid being abused.

The intelligent locator or independent locator chip capable of be equipped on both of main-sui and sub-suit of COMS attire, in this case, once the main-sui of COMS attire and sub-suit of COMS attire is detached and used separately, these two pieces of attire capable of be located to each other.

The personal network accounts of COMS attire capable of be accessed through the scannable codes comprising QR codes dedicated for COMS attire, wherein the scannable codes comprising QR codes dedicated for COMS attire serve as the brand verification mark of COMS attire, the identity information mark comprising contact information of wearer of COMS attire, and the login path mark of wearer's personal network account; the displayed range of content of personal network accounts connected with scannable codes is set and updated by wearer at any time, the content of account connected with scannable codes capable of be selectively set to full display, half display and no display; wherein, the fully display means after a scannable code is scanned, the entire content of account is displayed; the half display means after a scannable code is scanned, part of preset content of account is displayed; no display means after a scannable code is scanned, the content of account is not displayed; the personal network account of COMS attire comprises confidential data account and communication account, wherein the confidential data account and communication account only login by method of data assembly verification; wherein the steps of data assembly verification method are: the local fragmented data and remote fragmented data successfully assembled on server side, the account login is success, but the local fragmented data and remote fragmented data fails to be assembled on server side, the account login fails; wherein, the scannable code on COMS attire is made into different decorative graphics representing different account windows and different categories of stored data for directional scanning and accurate retrieval of data.

Similar Technologies

Generally speaking, most of similar technologies are single-oriented, and they are not combined into a compound-oriented, moreover, even as single-oriented technologies, the present application have also greatly improved the technical structure and application of those similar technologies.

Many people, especially the elderly, schoolchildren, sick and disabled, will take mobile phones as a burden, but nobody regard attire he wearing as a burden. Unfortunately, although the mobile phone is inconvenient to carry, people have to carry it with them everywhere because there is no other choice.

COMS attire is precisely the application for such users.

Compared to existing mobile devices:

People have long relied on attire and "hands" to carry mobile devices, comprising mobile phones, even if it is inconvenient, this can only be the case; the application of COMS attire here turns the attire itself into mobile device, which improves the traditional mode of carrying; but people's attire is different in the four seasons, especially in hot summer, the attire that act as COMS attire will still become the burden of user in travel; the attire invented here can be easily converted into a backpack, back apron, shoulder bag, and a pair of sub-suit of COMS attire anytime, anywhere, as long as these designs can add fashion elements and consider the needs of men, women and children, the trouble of using COMS attire in summer or in different scenarios can be solved, thus forming the novelty and originality of present application.

COMS attire is much larger than existing mobile phones, it is easy to get into sight of people, and easy to be found, which is also an obvious advantage of COMS attire.

Carry on: COMS attire is a wearable product, it should follow wearer to go everywhere, but mobile phone is carried, it is easy to be separated from wearer in different places, which brings the risk of losing or forgetting. Besides, the main support of existing mobile phone in operation is "hand holding", while the main support for COMS attire is attire, so COMS attire liberates the user's hand to a certain extent.

Carrying capacity: the ability of COMS attire to carry hardware components and related software far exceeds that of existing mobile phones, which has broken through the "miniaturization" frame that plagued mobile phones for a long time, and COMS attire has more room for expansion than the existing mobile phones.

Ease of operation: COMS attire's dial and function keys are made into attire buttons, then the design of its size and shape have more choices than existing mobile phones; attire buttons are easy to be accurately positioned by wearer, and buttons made into different shapes are easy to be touched by wearer in dark, which makes the dial and function key or buttons of COMS attire more convenient for operating. In particular, it is more suitable for people with visual impairment who can only choose dial and function key or buttons of different shapes by hand feeling; in addition, the dial range of COMS attire is pre-set, the number of keys is reduced, and the rate of operational errors will be greatly reduced.

Security: COMS attire uses special data fragment processor to fragment and process the transmitted and stored data, which is not yet seen in existing mobile phones.

Compared to the existing attire-backpack combination technologies:

The present application creates a complete different type of backpacks with different structures, with the addition of intelligent functions, with the attributes of backpack straps converted into intelligent components, and backpack becomes an important measure to protect intelligent devices and independent components.

Novelty and Originality

People always praise the "magic" of intelligent products, but often inadvertently neglect the help of carrying ways to intelligent products; in order to carry intelligent products conveniently, people always wear attire with enough pockets or carry bags with large volume, but when talking about the use of intelligent goods, they often underestimate the role of attire and bags.

Indeed, even if there are attire and bags in hand, intelligent products may not be able to play their due role as expected.

As a result, a new type of intelligent travel attire came into being, and many tragic stories directly gave birth to this clothing design.

At this point, if there is an intelligent tool of attire that can meet the preferences of the mentally retarded elderly, it will of course replace to replace useless and redundant pockets of attire, and the mentally retarded elderly will not lose her way or even lose her life; unfortunately, there has never been such suitable attire on the market.

Imagine that many mentally retarded elderly people fall down on the roadside because of hunger and physical overdraft, and even fall into the mud pond, from then on, no one knows the origin of their lives, and sadly, future generations will follow their predecessors 'trajectory to the same tragedy; perhaps their lives will be saved as long as they carry with them a kind of information or intelligent items to help them return home, as well as a bag of money and things to help them survive.

This application has been around the transformation of attire, everyone needs to wear attire, and people always have to wear attire, attire are the most common and most commonly used daily necessities, should also be the most reliable carrier of intelligence or information.

One of its remarkable originality is: install a mouth on attire, let the attire speak for people.

The application is a method, process and product of combination of several single-oriented fabric and intelligent technologies, in which the combined single-oriented technologies comprise attire-attire assembly, attire-backpack assembly, attire-fabric cord pipes assembly, pocket-supporting device assembly, attire-intelligent element assembly; the novelty and originality the application is mainly embodied in that it combines different technologies and into one technology, moreover, it makes the applicability of those single-oriented technologies significantly improved.

The application not only combines these single-oriented technologies into a composite technology, but also improves the structure of the single-oriented technologies and creates a new mobile device in the form of attire, and it also takes into account the fashionable needs of this combination, thereby which further enhances the novelty and originality of the application.

1. The assembly of attire and attire.

The "two-layer fabric" is clearly defined as a combination of two separate pieces of attire, one of which is mainly used for carrying mobile devices, components and scannable codes, and the other is mainly used for ordinary fashion attire; this "two-layer fabric" can be used to convert into backpacks, or can also be used to transform into different types of attire for wearers to change attire, this feature is not available in a variety of similar technologies.

2. The assembly of attire and backpack.

A backpack is assembled with two pieces of attire, and its volume of the interlayer will greatly exceed the ordinary backpack.

The interlayer of two layers of COMS attire is stitched into three spaces: the interlayer space on back of attire, the interlayer space on left front chest part of COMS attire, and the interlayer space on right front chest part of COMS attire, these three interlayer spaces capable of be placed into an inner pocket detachably; in colder season, the inner pocket is filled with soft filler or air used to keep warm for wearer and as a cushion for hardware on attire; the inner pocket is emptied or removed for reducing wearing of people in warmer season; wherein the connector of inner pockets with attire comprises fabric bolt, sling, button and zipper.

When a attire is converted into backpack, the interlayer space on back of attire is converted into main backpack, the interlayer space on left and right front chest part of attire are converted into two separate sub-backpacks, one is on left side, another is on right side of main backpack; the opening of the two sub-backpacks capable of be closed with tightening cords or similar devices, or they are kept open for loading commonly used and less important items; wherein the original attire inner pockets can be used as a cushion in backpack after being filled to reduce the possibility of hardware in backpack squeezing each other.

3. The assembly of attire and fabric cord pipes.

The fabric cord pipes in the present application is not only used for cords of devices and independent components, but also used for sharing pocket pressure, which comprises acting as load-bearing cords.

4. The assembly of attire and intelligent element.

The present application not only carries mobile hardware, but also carries fabric intelligent elements such as scannable codes on scannable decorative fabric; the scannable decorative fabric described here belongs to "fabric" to be carried by attire, and it is easy to be detached by wearer, so which facilitate wearer timely updating scanning code on his attire.

The application incorporates the technical elements of attire-attire assembly, attire-backpack assembly, pocket-supporting device assembly, and attire-intelligent element assembly, so it has a broader use than other similar items.

Specific Implementation

Components of various network communication devices and related hardware and software are dispersed and installed in different parts of attire, which forms COMS attire, but this is not a common communication device but a kind of attire, therefore, it should take into account the visual effect and comfort of wearing, and the software and hardware components of devices should not be placed at will; moreover, attire should be decorated with many pieces of cloth, decorative pockets, special pockets and decorative pipes, these pieces of decorative cloth are used to cover devices, components and backup materials on attire, such as decorative pocket covers and fabric decorative cord pipes.

Embodiment 1, as shown in FIG. 1:

The COMS attire will be attached to several supporting holders, where multiple dial and function keys, chips and auxiliary devices will be centralized on one supporting holder, while the supporting holders will be equipped on the location of attire that are hidden but convenient for users to operate and protect, the support holders are covered by decorative piece or installed in the interlayer of attire, which comprising the support holder of keyboard at the front chest location of attire 4, the supporting holder of microphone and warning device on both or one shoulders of attire 5, the supporting holder of microphone and warning device in pocket cover location of attire 6, the supporting holder of backup device 7 in special pockets 18 of attire.

Among them, the special pocket 18 is specially used for placing backup devices and some independent components, which are placed in the concealed location of attire.

In COMS attire 1, neckband at collar location 12, shoulder strap 11 and waistband 12 are used to share the load of supporting holders and special pockets 18 respectively, the various devices and independent components on attire are connected together by cords in decorative pipe, they can set up power supply separately or share power supply together; the main decorative pipe comprises decorative waistband pipe and fabric decorative cord pipe 10, shoulder strap and fabric decorative cord pipe 11, neckband at collar location and fabric decorative cord pipe 12, where fabric decorative cord pipe and waistband, shoulder strap and neckband capable of be combined and installed in the same place of attire.

As an option, COMS attire is also installed corded earphones 17 and the corded microphone 16.

The cord of earphone 17 of COMS attire is arranged from top to bottom along the front opening of attire, and the upper end is fixed and the lower end is free. When used, the corded earphone 17 is lifted from the lower end of cord and is stuck in the ear of COMS attire wearer or is kept near the wearer's ear, while the corded microphone 16 is positioned at the upper and middle parts of cord of earphone, and is just located near the mouth of the COMS attire wearer.

Embodiment 2, as shown in FIG. 2:

The inner and outer layers of the interlayer of COMS attire 1 are turned over, the collar part of attire 12 and the bottom of attire are upside down, and the opening of the backpack formed by the bottom of attire is tightened with a rope, which forms a backpack 1.1.

Backpack strap 29 of COMS attire is attached with fabric decorative cord pipes, special pocket 31, and corded supporting holder of devices 30, the devices held by corded supporting holder comprising mini-screen, keyboard and traditional mobile phone; the corded supporting holder of devices can be placed in special pocket 31 of backpack strap when it is not in use; wherein, the special pockets 31 attached on backpack strap have outlets leading to fabric decorative cord pipe for devices on supporting holder to connect outside of backpack strap by data cord and power cord; the fastener 32 on backpack strap is used to stabilize the corded supporting holder of device.

Embodiment 3, as shown in FIG. 3:

Folding COMS attire 1 into two overlapping parts with waistband pipe 10 of attire as dividing line, and tied the waistband to waist location of wearer to form the back apron transformed from COMS attire 1.2, which retains all the functions of COMS attire; the waistband is fitted with a sling of waistband 28, and the sling of waistband 28 is connected to waistband at the designated left, middle and right places on waistband; when used, the sling of waistband relies on wearer's shoulder to enhance the load capacity and stability of waistband 10 through the sling of waistband 28; when not in use, the sling of waistband 28 is placed parallel to waistband 10; as a back apron transformed from the COMS attire 1.2, all main devices, auxiliary devices and related components of COMS attire are located under waistband, among them, at least the supporting holder of keyboard originally at the front chest location of attire 4 and the supporting holder of microphone and warning device in pocket cover location of attire 6 will be in a state of being exposed or convenient for user to touch.

Embodiment 4, as shown in FIG. 4:

The information transmitted by COMS attire mainly comprises voice information, text information, image information and fragmented data.

COMS attire's information interaction objects mainly comprise:

COMS attire 1A or backpack 1.1 interacts with other COMS attire 1 B or backpack by network system.

COMS attire 1 or backpack 1.1 interacts with server 9 through network system, and COMS attire 1 or backpack 1.1 interacts with existing mobile phone 8 through network system.

COMS attire 1 or backpack 1.1 interacts with a voice and ringtone device of remote home or at a designated location 25 through network system.

COMS attire 1 or backpack 1.1 transmits data comprising voice information by means of remote network transmission devices, such as Wi-Fi, and which is mainly used for interaction between COMS attire 1 or backpack 1.1 and network server 9, and COMS attire 1 or backpack 1.1 transmits data comprising voice information by means of short-range network transmission devices, such as Bluetooth, which is mainly used for interaction between COMS attire 1 or backpack 1.1 and mobile phone 8 carried by wearer.

In addition, the remote transmission of data comprising voice information of COMS attire can only be achieved through server, and the methods used to connect server mainly comprise methods of SIM card or Wi-Fi system or their similar, all of which are used by COMS attire 1 or backpack 1.1 to establish interaction with selected caller, voice and ringtone devices of remote home or a designated location 25.

Embodiment 5, as shown in FIG. 5:

All the supporting holder of backup device and components (excluding corded supporting holder) attached to COMS Attire are connected to each other by fabric decorative cord pipes on COMS attire 15. The supporting holders attached to COMS attire mainly comprise:

The supporting holder of keyboard at the front chest location of attire 4, it is mainly to be installed dial and function key or buttons, anti-malfunction device, power switch 20 and chip (including fixed chips and removable chips) 21.

The supporting holder of microphone and warning device on one or both shoulders of attire 5, it is mainly used to install the microphone 23 and the warning device 24 in fixed location, such as remote control color eye-catching warning flashing lights.

The supporting holder of microphone and warning device in pocket cover location of attire 6, it is mainly used to install microphone 23 and warning device 24 in fixed location, such as remote controlled color eye-catching warning flashing lights; in addition, it is also used to install remote control broadcasting device 13 of attire, and help-seeking device of attire controlled remotely 14.

The supporting holder of backup devices and components in special pockets of attire 7, it is mainly to be installed power supply devices (including rechargeable batteries and device for connecting to external power outlets) 19, power switch 20, chips 21 (including fixed chips and removable chips) and data fragment processor 22.

Embodiment 6, as shown in FIG. 6:

This is a special building method of a corded foldable supporting holder of mini-screen on COMS attire:

A corded foldable supporting holder of mini-screen 26 and attire's decorative cover strip 29 are usually installed or placed as an ornament on upper chest location of attire and is adjacent to supporting holder of keyboard 4, its bottom piece fixed on attire connects with shoulder strap and fabric decorative cord pipe 11, and when it is in use, some traction ropes 27 are used to connect neckband (or buckle in pocket) of attire and corded foldable supporting holders of mini-screen 26 for stabilization.

A corded foldable supporting holder 26 is specially used for attaching a mini-screen comprising existing mobile phones, this supporting holder 26 capable of be folded comprising three sections and two sections, one of sections is folded up and detachably inserted in the decorative cover strips 29 located at chest location of attire to act as a supporting lever, and one of other sections is suspended on front chest location of attire in the shape of a suspension bridge after being opened for wearer to observe mini-screen on supporting holder, and magnetic thin material is embedded in the chest part of attire to strengthen the stability of supporting holder of mini-screen; while the mini-screen is not in use, the corded foldable supporting holder of mini-screen 26 is detached from the decorative cover strip 29 on front chest location of attire, and is folded and stored in pocket of attire; wherein, one end of the cord of supporting holder is connected to neckband or buckle in pocket of attire.

The invention claimed is:

1. A COMS attire comprising a convertible combination of attire and a backpack with network communication and intelligent sensing features, wherein the attire is changeable between an article of clothing and a backpack;

the COMS attire further comprises:

a chipset of hubwear that provides communication and sensing features on the attire, wherein the hubwear supports intelligent devices, independent components, auxiliary devices on the attire;

a plurality of intelligent devices including at least one of an interphone, a dedicated scanner, a dedicated sensor, a dedicated radio, an intelligent rear-view system, an intelligent locator, and independent locating chip;

fabrics for carrying hardware, said fabrics including a supporting holder, a backpack strap, an attachable neck bag, pocket and ports;

a corded supporting holder to secure a foldable mini-display screen;

an application that comprises a pre-installed speedy chain button software capable of accessing an application stored;

a personal network account system that provides technical services to users, the personal network account capable of being accessed via scannable attire codes;

wherein identity information of said attire comprises an attire identity code and a hubwear hardware identity authorization credential for communication between members in the preset communication group;

wherein the intelligent hardware on said attire comprises hardware waterproofing, hardware anti-squeeze cushioning, and hardware anti-lost and anti-fall functionality;

wherein said attire comprises hardware anti-lost and anti-fall functionality stored in the conversion process between an article of clothing and a backpack;

wherein said attire is capable of remote data transmission of voice information, text information, image information, physical information, and fragmented data through a dedicated network server;

wherein said attire is capable of short range data transmission of voice transmission, text transmission, image information, physical information, and fragmented data;
a group signaling chain button that is capable of sending contact signals to relatives, friends, and/or emergency personnel in case of an emergency.

2. The convertible combination of attire and backpack recited in claim 1, wherein the COMS attire comprises a detachable hat, a neck bag, a waistband, and intelligent decorative fabrics;
wherein the COMS attire is composed of a main body of an article of clothing and a matching body of an article of clothing;
wherein the main body of the article of clothing is equipped with intelligent hardware and software, and a decorative fabric cover equipped with intelligent features;
wherein the matching body of the article of clothing is not equipped with intelligent hardware and software;
wherein the main body of article of clothing and the matching body of article of clothing is made into complete attire with a interlayer in the middle;
wherein the main body of article of clothing worn outward acts as a functional attire, the matching body of article of clothing worn outward acts as an ordinary attire, and both the interlayer of main body and the interlayer of matching body turned from inside out together to form a backpack;
wherein article of clothing changeable to backpack and back apron;
wherein the backpack is formed by turning the inner layer of interlayer of article of clothing to outer layer of backpack and turning the top of article of clothing to bottom of backpack;
wherein the detachable hat on COMS attire is capable of be used as neck bag and a shoulder bag after it be detached from attire, and is storable in a pocket in the interlayer of COMS attire.

3. The plurality of intelligent devices recited in claim 1, wherein the intelligent devices are shareable when the attire changes between an article of clothing and a backpack, and wherein the hubware is programmable to support intelligent devices, independent components, and auxiliary devices on COMS attire;
wherein the independent components of COMS attire comprise intelligent decorative fabrics and special chips;
wherein the chipset of hubware comes with remote network connectors comprising Wi-Fi, and short-range network connectors comprising Bluetooth;
wherein the components of hubware chipset comprise chips of system data storage, chips of user data storage, chips of application software storage, chips of fragmented data processor, and chips of temporary data processing (RAM);
wherein the hubware chipset has a SIM card slot to make SIM card freely installed, replaced and removed by user;
wherein the hubware chipset communicates by using a dedicated network account as a credential;
wherein the network account is used to manage information of the hubware chipset and overall COMS attire by the attire owner;
wherein the hardware identity information of the hubware chipset be a key credential to be used when verifying the dedicated network account;
wherein the hardware identity information of hubware chipset comprises a serial number and an internal code, the hardware identify information acts as communication verification credentials in network activity of COMS attire.

4. The article of clothing recited in claim 1, wherein the clothing is capable of being made with a combination of a main-suit and a sub-suit, wherein the sub-suit is a simplified main-suit capable of be detached from the main-suit and used independently;
wherein the sub-suit of COMS attire is detachably tied on a collar location of the main-suit of the COMS attire with a fastener comprising fabric bolts, slings, buttons and zippers;
wherein the sub-suit shares a plurality of features with the main suit comprising the same identity information of COMS attire, the same application software, and the same network account;
wherein the settings of network account can only be modified through the authentication by the hubware;
wherein the sub-suit of COMS attire selectively equipped devices comprises a dedicated merger phone comprising interphone, dedicated scanner, dedicated sensor, dedicated radio and intelligent rear-view system;
wherein the sub-suit is selectively equipped with a supporting holder of hubware, a supporting holder of rechargeable batteries comprising solar cells, a supporting holder of keyboard and mini-screen, supporting holders of mini-camera, and backpack strap;
wherein the sub-suit and main-suit of COMS attire are capable of finding each other via network communication and hoot devices;
wherein if the sub-suit and main-suit of COMS attire are separated by a short distance, a search button on one of the suits is capable of be pressed to initiate the hoot device on the other suite;
wherein the network communication in short range is established by pressing the search button comprising Bluetooth.

5. The COMS attire recited in claim 1, wherein the COMS attire comprises the attribute of a backup and supplementary platform for existing intelligent devices comprising mobile phones;
wherein the backup attributes of COMS attire comprises the existing mobile phone used as hubware, dedicated mini-screen, dedicated merger phone comprising interphone, dedicated scanner, dedicated sensor and dedicated radio on COMS attire;
wherein the supplementary attributes of COMS attire comprises a rear-view system on COMS attire used to help existing mobile phones complete function of observing the scene behind wearer's body;
wherein the supplementary attributes of COMS attire comprises scannable items comprising scannable codes, images, and physiological and physical information;
wherein the scannable items attached to COMS attire comprises OR codes that are generated in the dedicated network account.

6. The preset communication group of COMS attire recited in claim 1, wherein several pieces of COMS attire are capable of being formed into a communication group through the settings in the network account, and hardware identity information of their hubware used by group members to identify each other during group communication;
wherein the hubware acts as a communication authorization credential on COMS attire divided into a primary hubware and a secondary hubware, wherein primary hubware supports initiator account of communication, wherein secondary hubware supports participant account of communication;

wherein the holder of primary hubware sets up a contact list in an initiator account of communication;

wherein the initiator account is a network account on a server, wherein the contact list comprises serial numbers of secondary hubwares of COMS attire;

wherein only the secondary hubwares listed in contact list of initiator account are eligible to communicate with the primary hubware, then participant capable of contacting initiator through network;

wherein, several COMS attire with different hubware form a communication group, wherein a hubware in this communication group may be designated primary hubware, but in another communication group may be designated secondary hubware.

7. The fragmented data processor recited in claim 3, wherein when hubware acts as a fragmented data processor on COMS attire, the fragmented data processor and local fragmented data are selectively and separately stored in hubware, and capable of being set to reject other type of data to store in storage chips dedicated to fragmented data;

wherein the working steps of the fragmented data processor on COMS attire comprise:

the full data transmitted from mobile devices to COMS attire split into local fragmented data and remote fragmented data, wherein local fragmented data is stored in storage chips of hubware on COMS attire, remote fragmented data is transferred to a remote server for storage by COMS attire;

wherein the fragmented data destroyed the informative meaning by adding interfering code, disrupting code sorting by processor, and never restored to original full data with only a piece of separate fragmented data;

wherein the local fragmented data capable of being made into decorative graphics on attire comprising QR code graphics is used for login verification credentials for a particular COMS attire account, and directly used for COMS attire account login verification credentials;

wherein when local fragmented data as is a verification credential detected by the account system, the local fragmented data and related remote fragmented data enter the process of assembling and restoring to original full data file on server side;

where in when assembly and restoration succeeds the account login verification succeeds, otherwise, login verification fails.

8. The hubware recited in claim 3, wherein the system support provided by hubware comprises the system support to COMS attire and the system support to other desktops and laptops;

wherein the hubware acts as a center chip on COMS attire programmed to provide system support to various mobile intelligent devices, auxiliary devices and independent intelligent components on COMS attire;

wherein the hubware also provides basic operating system support for desktops and laptops other than COMS attire, in this case, the system data stored in hubware input into the RAM of desktops and laptops to support the operation comprising keyboard, mini-screen, mouse, external storage device and RAM, then the desktop and laptop is dominated by hubware, and its original operating system stops working;

wherein in hubware dominated desktops and laptop, the operating system is composed of two parts, one part provided by hubware, the other part downloaded from network server, and the network part complementary to the part provided by hubware;

wherein the network part of operating system is guided and detected by hubware, and downloaded to desktops and laptops as needed;

wherein the hubware part and the network part of operating system combined into one and run in the RAM of desktops and laptops.

9. The intelligent rear-view system of COMS attire recited in claim 4, wherein the intelligent rear-view system on COMS attire comprising a set of devices to take in and record in the scene behind wearer's body through a rear-view camera equipped on back of COMS attire, wherein the wearer observes the scene behind their body from a mini-screen located at the front of COMS attire;

wherein the rear-view camera is selectively placed on a concealed part of back side of article of clothing and the outer surface of backpack;

wherein a special corded supporting holder attached rear-view camera is hung on the back side of attire by wearer at will, and the rear-view camera being hidden on back of COMS attire act as the eyes behind wearer;

wherein an image taken by rear-view camera on back side of COMS attire is capable of being transmitted to mini-screen on front of the COMS attire via a data cord in the fabric decorative cord pipe, and a network connector comprising Bluetooth and Wi-Fi.

10. The speedy chain buttons recited in claim 1, wherein the speedy chain buttons on said COMS attire comprise the speedy group-signaling chain button and the speedy function-selection chain button;

wherein the dedicated application software comprising speedy chain button software is downloaded by a wearer from COMS attire network resources and installed in hubware;

wherein the group-signaling chain button may be used to send contact signals to relatives, friends and police in an emergency, when the button is pressed once by wearer, the system sends emergency signals to a group of pre-set members;

wherein sending emergency signals comprises sending a signal to alarm devices in remote home and designated locations via remote connector on COMS attire;

wherein when the SIM card is used to send call signals with group-signaling chain button, the button may be set to automatically dial the phone number to each member of group according to the pre-set order, wherein once the first recipient is contacted, the subsequent signals transmission are automatically stopped;

wherein the speedy function-selection chain button software helps the wearer to set functionality of the speedy function-selection chain button on COMS attire;

wherein the hubware of COMS attire is connected to speedy chain buttons by data cords and a short-range network connector comprising Bluetooth, and the speedy chain buttons is connected to intelligent devices, auxiliary devices and independent components on COMS attire by data cords and short-range network connector comprising Bluetooth.

11. The intelligent decorative fabric recited in claim 1, wherein the intelligent decorative fabric comprises a decorative pocket cover attached on COMS attire's main body and its interlayer;

wherein the decorative pocket cover be used for decorative purposes and for placing intelligent cards comprising intelligent door entry cards and scannable codes;

wherein the scannable codes comprise a OR code, barcode, images, and identification codes for physical and physiological characteristics;

wherein the functions of intelligent decorative fabric comprise identification, verification and alarm prompts;

wherein the intelligent decorative fabric comprises scannable and recognizable decorative fabrics, hardware decorative fabrics, and mixed decorative fabrics;

wherein the scannable and recognizable decorative fabrics are without any intelligent hardware, and are printed and added with scannable codes, images, and information recognizable by intelligent sensing devices;

wherein the mixed decorative fabric is both printed with scannable and recognizable information, and installed with intelligent hardware;

wherein sensing software comprises software for reads and uploads RFID tags;

wherein the mini-alarm device is made into an ornament attached to intelligent decorative fabric, when over-distance separation occurs, the intelligent decorative fabric and the alarm unit of mobile device give alarm prompts either unilaterally and/or jointly.

12. The intelligent sensing devices recited in claim 1, wherein the intelligent sensing devices on COMS attire comprises sensitive buttons, sensitive decorative fabrics, sensitive decorative badges and sensitive signs;

wherein the sensitive buttons comprise function activation switches, a function selection switch, a communication connection switch and a power switch;

wherein the acceptable information by intelligent sensing devices on COMS attire comprises physical information comprising light source, physiological information comprising fingerprints and facial features, and digital information comprising images and identification codes.

13. The merger phone on COMS attire recited in claim 1, wherein the merger phone on COMS attire shares auxiliary devices on attire comprising power supply, speakers, keyboard and network connection configuration;

when a phone on COMS attire is issuing commands to SIM card, the card executes and rejects according to a standard specification;

wherein the SIM card serves as information storage partly for COMS attire;

wherein the merger phone transmission system on COMS attire comprises SIM card data transmission system, remote network transmission system, and interphone system;

wherein the merger phone comprises a SIM card phone, a communication software phone and an interphone;

wherein the merger phone on the COMS attire and the existing mobile phone are capable of sharing a SIM card and a phone number with each other.

14. The scannable codes on COMS attire recited in claim 1, wherein each piece of COMS attire includes at least two scannable codes of:

codes used for owner of COMS attire to set up and log in personal network account;

codes comprising OR codes used for other people to obtain the public information comprising contact information from attire owner's account;

wherein the displayed range of content of personal network accounts connected with scannable codes be set and updated by the wearer at any time, the content of the account connected with scannable codes is capable of being selectively set to full display, half display and/or no display;

wherein, the personal network account of COMS attire comprises confidential data account and a communication account;

wherein the confidential data account and communication account login by method comprising data assembly verification;

wherein the steps of data assembly verification method comprises:

when the local fragmented data and remote fragmented data successfully assembled on server side, the account login success;

when the local fragmented data and remote fragmented data fails to be assembled on server side, the account login fails;

wherein each piece of COMS attire has two identity information comprising an attire identity code and a hubware hardware identity information;

wherein the attire identity code is unique in the system of COMS attire and attached to the attire, comprising intelligent decorative fabrics on the attire, and forming an interactive system with network accounts.

15. The remote control recited in claim 1, wherein the remote control comprises an active remote control of COMS attire and a passive remote control of COMS attire;

wherein the active remote control comprises speakers controlled by the attire owner, automatic voice devices controlled by the attire owner, alarm device controlled by the attire owner, camera controlled by the attire owner, power switch controlled by the attire owner;

wherein the passive remote control comprises a camera controlled by other users, power switch controlled by other users, alarm device controlled by other users, mini-speaker controlled by other users, eye-catching color flash controlled by other users, keyboard on COMS attire controlled by other users;

wherein the active remote control comprises a remote control for indoor appliance;

wherein the indoor appliances controlled by the remote control comprises lighting appliances, door opening and locking appliances, and monitoring appliances and alarm appliances;

wherein the power switch of COMS attire is connected to different battery packs, wherein the turn-on and turn-off of power switch on COMS attire is capable of be controlled by others from other locations through network.

16. The supporting holder on COMS attire recited in claim 1, wherein supporting holder comprises backpack straps, waistband and a specific holder;

wherein the waistband holds rechargeable batteries, power cords, data cords, wire interfaces and plugs;

wherein the keyboard and buttons, chips and auxiliary devices, and independent components are centralized equipped on supporting holders;

wherein the supporting holder is made of soft and semi-soft plastic, fabric and natural materials, and hollow sheets with built-in cords;

wherein the COMS attire is equipped with single and multiple supporting holders with selectively attached devices comprising mini-screen, keyboard and mini-camera;

wherein when the multiple supporting holders with the same functionality is equipped on the COMS attire, as long as one of supporting holders with the same functionality is selected by wearer, the functions of other supporting holders are capable of be disabled;

a corded foldable supporting holder used for attaching a mini-screen comprising existing mobile phones;

wherein the bottom part of a non-folding supporting holder and the decorative pocket cover on the chest of attire are capable of being temporarily bonded together with a binding item comprising magnetic materials, and the top part of the supporting holder is connected to the neckband of the attire with a traction rope to form the shape of a suspension bridge used for placing a mini-screen comprising mobile phones.

17. The backpack converted from an article of clothing recited in claim 1, wherein the conversion process comprises:

the inside of the original attire converted into the outer side of backpack;

the intelligent decorative fabric for the backpack originally hidden in attire interlayer converted to outside of backpack;

the neck bag and collar on up position of original attire converted into the bottom part of the backpack;

wherein the remote-control rear-view camera comprising night vision camera is equipped on the neck bag converted to the bottom part of the backpack;

when the space between two-layer of the original attire is converted into the inner space of backpack, then, all the intelligent hardware devices and independent components contained in the original attire placed inside backpack, still functioning as the components of intelligent backpack;

the backpack strap converted into a backpack strap from concealed in attire interlayer and is actually used as a operable supporting holder of intelligent devices;

the tightening rope at the bottom of the original attire converted into a tightening strap at the top of the entrance of the backpack;

wherein the backpack straps on COMS attire are a main place for mounted intelligent hardware devices and independent components rather than the backpack straps;

wherein the devices and independent components placed on backpack straps comprises a keyboard and a mini-screen;

wherein the backpack straps are equipped with cord pipes, power cords, data cords, and cord jacks;

wherein the pockets on the backpack straps are used to hold items comprising mobile phones.

18. The neck bag on COMS attire recited in claim 1, wherein the neck bag is capable of being detachably tied on a collar location of the attire with a fastener comprising fabric bolts, slings, buttons and zippers;

wherein the neck bag tied to the attire may be used as a hat to hang on the back of attire;

wherein the intelligent devices attached to neck bag comprise a mini-camera for the rear-view system;

wherein the neck bag is made of double-layer fabric, and when the interlayer is empty, the neck bag hangs on the upper part of back of attires as a decoration item, but capable of being erected when the interlayer is filled with air and soft filler to make the neck bag become a neck pillow;

wherein the neck bag connects with devices and independent components of main body of attire through a cord jack and network connectors comprising Bluetooth.

19. The intelligent locator and independent locator chip recited in claim 1, wherein the intelligent locator and independent locator chip are in a hidden part of COMS attire comprising temporary installation and permanent installation;

wherein the place of temporary installation comprises detachable sub-suit of COMS attire, and detachable intelligent decorative fabric on main-suit of COMS attire;

wherein the intelligent locator and independent locator chip are together with the detachable sub-suit of COMS attire and detachable intelligent decorative fabric on the main-suit of COMS attire and detachable from COMS attire at any time to ensure the locating function is only used as an emergency tracking tool in special circumstances such as searching of missing children and Alzheimer's patients and thereby preventing abuse of the tracking tool;

wherein the intelligent locator and independent locator chip are capable of being equipped on both of the main-suit and the sub-suit of COMS attire for locating each other.

20. The mini-alarm device on COMS attire recited in claim 1, wherein the mini-alarm on COMS attire comprises a remote-activated alarm device and a spot alarm device;

wherein the remote-activated alarm device is stored in a pocket and an interlayer of COMS attire makes a sharp sound to attract attention of passers-by when the controller at a remote location starts the alarm device on COMS attire through the network;

wherein the spot alarm is directly activated by the wearer of the COMS attire;

wherein the use of the COMS attire alarm devices comprises warning tweets to prevent the loss of elderly and children, warning tweets to prevent loss of wearer's items, and deterrent warning tweets when the wearer harassed by malicious people;

wherein the process of a warning tweet to prevent the loss of elderly and children comprises:

a third party remotely controlling the switch on the COMS attire and activating the alarm device through the network, then the alarm of the COMS attire worn by the elderly and children sounds a warning tweet;

wherein when the warning tweet is sounded, the alarm device sends a help signal that appears on mini-screens of pre-set COMS attire group members.

\* \* \* \* \*